Oct. 28, 1930.          E. E. McGREW          1,780,089
AUTOMOBILE AWNING
Filed Sept. 6, 1927
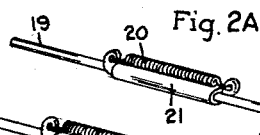
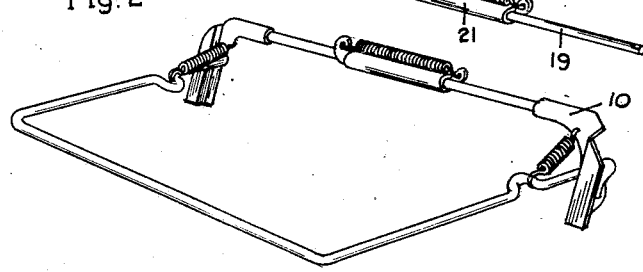
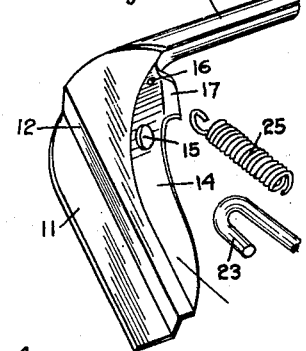
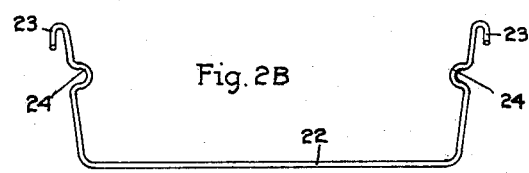
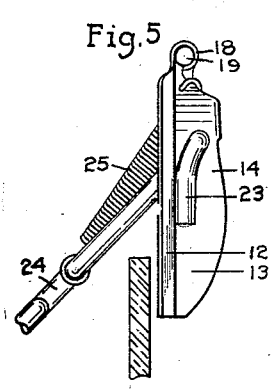
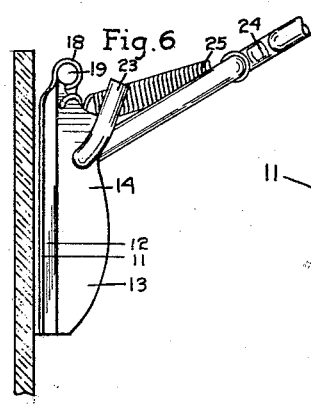
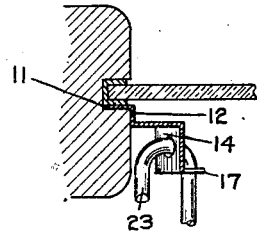
Inventor
E. E. McGrew
By Emil F. Lange
Attorney Patented Oct. 28, 1930

1,780,089

UNITED STATES PATENT OFFICE

EARL E. McGREW, OF LINCOLN, NEBRASKA, ASSIGNOR TO McGREW MACHINE COMPANY, OF LINCOLN, NEBRASKA, A CORPORATION OF NEBRASKA

AUTOMOBILE AWNING

Application filed September 6, 1927. Serial No. 217,699.

My invention relates to awnings and awning frames and more particularly to awnings of the type especially adapted for use in automobiles.

One of the objects of my invention is the provision of an awning which may be used in the window openings of automobiles of the closed type, the awning being arranged to extend outwardly from the window opening when in use as an awning and to rest against the lower surface of the top of the body when not in use.

Another object of my invention is the provision of a device of the kind specified which is so fitted into the window opening of an automobile that it cannot be stolen when the automobile doors and windows are closed.

One of the most important objects of my invention is the provision of an automobile awning frame which may be inserted into window openings of various widths.

Still another object of the invention is the provision of an awning and frame of extreme simplicity of construction and in use, whereby the awning and frame may be produced at low cost.

Having in view these objects and others which will be pointed out in the following description, I will now refer to the drawings, in which Figure 1 is an illustration of a portion of an automobile with my awning attached thereto.

Figure 2 is a view in perspective of the awning frame.

Figure 2A is an illustration showing the compressible rod which serves as the upper support for the awning fabric.

Figure 2B is a plan view of the spreader bail forming part of the frame shown in Figure 2.

Figure 3 is a view in perspective of the support whereby the frame may be secured in the window jambs of an automobile and showing also portions of the spring and the spreader bail respectively.

Figure 4 is a view in horizontal section through a portion of the window jamb of an automobile and showing in section a portion of my awning frame.

Figure 5 is an edge view of the awning frame in its operative position and showing its position in relation to the glass of the window.

Figure 6 is an edge view of the parts shown in Figure 5 but showing the position of the spreader bail when the awning is not in use.

At each of the two upper corners of the awning frame shown in Figure 2 is a support 10 which is shown in detail in Figure 3. This support is preferably stamped and formed from sheet metal and it is provided with a thin lip 11 which is adapted to enter the narrow slit between the felt packing of a window channel and the jamb as shown in Figure 4. In this way I avoid using the window groove for securing the awning frame, thus making it possible to open and close the window without removing the awning frame. The awning frame is inserted on the inner side of the window so that it is entirely within the car when not in use. The support 10 is also provided with a web 12 which is adapted to rest against the surface of the window jamb and with a portion 13 which is spaced from the window jamb. The support is further provided with a curled tongue 14 having two apertures 15 and 16 and having also a stop member 17, the stop 17 being bent into the path of the pivoted spreader bail. The end portion of the support is turned into cylindrical form at 18 to form a cylindrical socket. The entire support 10 is integral, being shaped and formed from a single piece of sheet metal.

The upper support for the awning web is best shown in Figure 2A. This consists of two rods 19 which in the present instance are overlapping at their inner extremities and having a coiled spring 20 connecting their inner ends. A ferrule 21 surrounds the overlapping portions of the two rods 19 and holds them in parallelism during the sliding movements. It will be obvious that the action of the spring 20 tends to hold the rods 19 with their outer extremities in spread apart relation. In the assembled device the outer extremities of the rods 19 are seated in the respective socket members 18 of the supports 10.

The spreader bail 22 is shown in plan view in Figure 2B. It is made from more or less resilient material by bending it into the form shown and having hooked and outturned extremities 23. The spreader bail also includes two U-shaped bends 24 the purpose of which will be subsequently explained. The hooked ends 23 of the spreader bail are engaged in the apertures 15 of the supports 10. It is obvious that the bail 22 will have pivotal movement about its axis in the apertures 15 and that this pivotal movement is limited in one direction by the outturned ends 23 engaging the support 10 and in the other direction by the arms of the bail engaging the stops 17, the two extreme positions being shown in Figures 5 and 6. It will be noted also that the portion 13 of the support 10 is spaced from the window jamb a distance such that the end 23 of the spreader bail will be out of all contact with the surface of the window jamb so that no marring or scratching of the surface of the window jamb is possible.

One marked advantage of the construction described is that the frame may be adapted to window openings of a great variety of widths. The spreader bail as shown in Figure 2B is necessarily narrow enough in its transverse portion to pass through the window opening. The lateral arms of the bail are diverging and their upper ends may be forced toward each other due to the resiliency of the material. The support for the upper edge of the awning fabric includes the two rods 19, the outer ends of which may be forced toward each other. In this manner it is possible to firmly seat the frame in windows of various widths. If the upper support under its maximum compression is still too long, the outer ends of the rods 19 may be withdrawn from the socket members 18 and the end portions of the rods 19 may be cut off to reduce the upper support to a suitable length. This feature is of extreme importance since it enables dealers to carry a relatively small stock of the awnings with which to supply owners of cars of a considerable variety.

As thus far described the spreader bail is merely pivoted to the supports 10 and it is of course necessary that some holding means be provided for preventing the pivotal movements of the frame when the awning is in either its operative or its inoperative position. For this purpose I provide a spring 25 having one end secured through the aperture 16 of the support 10 and the other end secured to the bend 24 of the arm of the spreader bail. In a movement from one extreme position to the other the spring must pass dead center and it is under tension in both of its extreme positions to positively hold the awning in either its operative or its inoperative position. When in its operative position the awning and its frame are inclined downwardly and outwardly as shown in Figure 5 and when not in use, the awning and frame are inclined inwardly and upwardly as shown in Figure 6. While any desired inclination may be adopted in the manufacture of this awning it is desirable that when the awning is not in use, its free edge is at or near the under surface of the top of the automobile.

It will be obvious from the foregoing description that I have provided a structure of extreme simplicity. It may be made and sold at a relatively low price and it is adaptable to a wide range of cars because it is expansible in width. Its installation does not require the services of a mechanic and it may be installed by anyone in a few minutes of time. When the doors and windows of the car are entirely closed, the awning is wholly inside the car where it cannot be removed without opening the door of the car.

Having thus described my invention in such full, clear, and exact terms that its construction and operation will be readily understood by others skilled in the art to which it pertains, what I claim as new and desire to secure by Letters Patent of the United States is:

1. Means for securing an awning in an automobile window, the awning having a support on a normally extended compressible rod, said means including a pair of members each provided with a collar portion for loosely receiving an end portion of the supporting rod of the awning, said members also having downturned portions provided with outwardly projecting lips adapted to enter slits in the window jambs of the automobile.

2. Means for securing an awning in an automobile window, the awning having an upper support on a normally extended compressible rod and having a lower support on a pivotally moveable bail, said means including a pair of members each provided with a collar portion for receiving an end portion of the supporting rod of the awning, said members also having downturned portions provided with outwardly projecting lips adapted to enter slits in the window jambs of the automobile, said downturned portions being each provided with an aperture adapted to pivotally receive an end portion of the lower supporting bail.

In testimony whereof I affix my signature.

EARL E. McGREW.